United States Patent
Araki et al.

(10) Patent No.: US 11,468,796 B2
(45) Date of Patent: Oct. 11, 2022

(54) NUMERICAL SPLITTING DEVICE, TRANSMISSION INFORMATION GENERATING DEVICE, SECURE COMPUTATION DEVICE, METHOD, PROGRAM RECORDING MEDIUM, AND SECURE COMPUTATION SYSTEM

(71) Applicant: NEC Corporation, Tokyo (JP)

(72) Inventors: Toshinori Araki, Tokyo (JP); Kazuma Ohara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 518 days.

(21) Appl. No.: 16/613,189

(22) PCT Filed: May 18, 2017

(86) PCT No.: PCT/JP2017/018653
§ 371 (c)(1),
(2) Date: Nov. 13, 2019

(87) PCT Pub. No.: WO2018/211653
PCT Pub. Date: Nov. 22, 2018

(65) Prior Publication Data
US 2021/0082319 A1    Mar. 18, 2021

(51) Int. Cl.
*H04L 29/06*    (2006.01)
*G09C 1/00*    (2006.01)
(Continued)

(52) U.S. Cl.
CPC .............. *G09C 1/00* (2013.01); *G06F 7/523* (2013.01); *G06F 7/582* (2013.01); *G06F 7/588* (2013.01)

(58) Field of Classification Search
CPC . G09C 1/00; G06F 7/523; G06F 7/582; G06F 7/588
(Continued)

(56) References Cited

U.S. PATENT DOCUMENTS

| | | | | |
|---|---|---|---|---|
| 7,065,210 | B1 * | 6/2006 | Tsujii | H04L 9/0847 380/259 |
| 2002/0003877 | A1 * | 1/2002 | Katayanagi | H04L 9/302 380/277 |
| 2019/0012144 | A1 * | 1/2019 | Harada | G06F 7/58 |

FOREIGN PATENT DOCUMENTS

| | | |
|---|---|---|
| JP | 2012-078446 A | 4/2012 |
| JP | 2014-137740 A | 7/2014 |
| JP | 5872084 B1 | 3/2016 |

OTHER PUBLICATIONS

International Search Report for PCT Application No. PCT/JP2017/018653, dated Aug. 15, 2017.
(Continued)

*Primary Examiner* — Evans Desrosiers
(74) *Attorney, Agent, or Firm* — Sughrue Mion, PLLC

(57) ABSTRACT

This numerical splitting device: acquires a numerical value w and a parameter p; generates a first random number r1 and a second random number r2; computes a third random number r3 based on the numerical value w, parameter p, first random number r1, and second random number r2 according to an expression, $r3=w-r1-r2 \mod p$; computes first to third segments s1, s2, s3 based on the first to third random numbers r1, r2, r3 and the parameter p according to expressions, $s1=r1+r2 \mod p$, $s2=r2+r3 \mod p$, and $s3=r3+r1 \mod p$; and transmits a pair of the first segment s1 and the second random number r2, a pair of the second segment s2 and the third random number r3, and a pair of the third segment s3 and the first random number r1 to first to third secure computation devices, respectively.

10 Claims, 10 Drawing Sheets

(51) Int. Cl.
*G06F 7/523* (2006.01)
*G06F 7/58* (2006.01)

(58) Field of Classification Search
USPC .......................................................... 380/28
See application file for complete search history.

(56) References Cited

OTHER PUBLICATIONS

English translation of Written opinion for PCT Application No. PCT/JP2017/018653.
Toshinori Araki, Jun Furukawa, Yehuda Lindell, Ariel Nof, Kazuma Ohara, "High-Throughput Semi-Honest Secure Three-Party Computation with an Honest Majority", ACM-CCS'16, Oct. 24-28, 2016, Vienna, Austria.
Dai Ikarashi et al., "Keiryo Kensho Kano 3 Party Hitoku Kansu Keisan no Koritsuka Oyobi kore o Mochiita Secure na Database Shori (Secure Database Operations Using An Improved 3-party Verifiable Secure Function Evaluation)", 2011 Symposium on Cryptography and Information Security, Kokura, Japan, Jan. 25-28, 2011, 2C3-6, pp. 1 to 8.
Dai Ikarashi et al., "Multi-Party Keisan Kano na Himitsu Bunsan ni Okeru Data Kaizan Kenchi Hoho (Short Secret Sharing Applicable to Multi-Party Computation against Cheating)", 2013 Symposium on Cryptography and Information Security Gaiyoshu, 3C3-1, 2013 Symposium on Cryptography and Information Security Jikko Iinkai, Kyoto, Japan, Jan. 22-25, 2013, pp. 1 to 8.
Toshinori Araki et al., "Tsushinryo no Chiisai 3 Shakan Multi-Party Keisan to Bitslice-ho o Mochiita Jisso (Secure Three-Party Computation with Low Communication and Its Implementation via Bit-Slicing)", 2017 Symposium on Cryptography and Information Security, Naha, Japan, Jan. 24-27, 2017, 2D3-5, pp. 1 to 7.

* cited by examiner

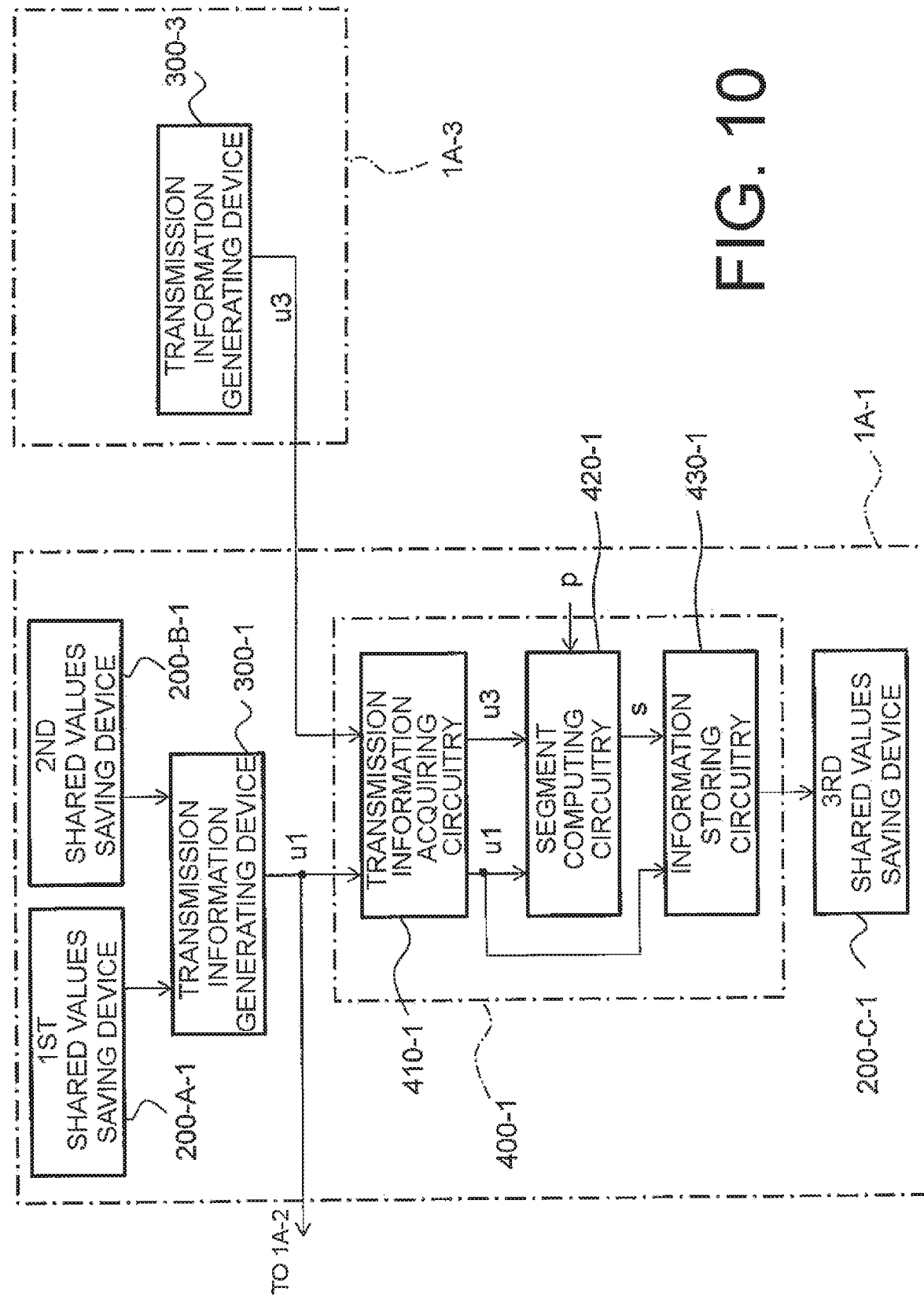

NUMERICAL SPLITTING DEVICE, TRANSMISSION INFORMATION GENERATING DEVICE, SECURE COMPUTATION DEVICE, METHOD, PROGRAM RECORDING MEDIUM, AND SECURE COMPUTATION SYSTEM

This application is a National Stage Entry of PCT/JP2017/018653 filed on May 18, 2017, the contents of all of which are incorporated herein by reference, in their entirety.

TECHNICAL FIELD

This invention relates to a numerical splitting device, a transmission information generating device, a secure computation device, method, a program recording medium, and a secure computation system.

BACKGROUND ART

A secure computation method is a method of computing a given function by a plurality of secure computation devices performing computation while communicating with one another. The secure computation method has such a characteristic that none of the secure computation devices can acquire information on input/output to/from the function unless data to be handled are shared by a sufficient number of secure computation devices.

As a publicly known secure computation method, a method described in Non Patent Literature 1 is known.

The secure computation method described in Non Patent Literature 1 can be implemented by three secure computation devices. In the manner which will later be described, in the secure computation method described in Non Patent Literature 1, computation of a product is implemented by each secure computation device which carries out two multiplications and one division.

Patent Literature 1 discloses a secure computation system for executing secure computation by three computation devices in which a numerical value X is recorded in a split state. The three computation devices record segments of the numerical value in the split state (shared information), and execute the secure computation. Assuming that the segments stored in first through third computation devices are represented by $(x_0, x_1)$, $(x_1, x_2)$, and $(x_2, x_0)$, respectively, then the numerical value X and the segments satisfy a relationship of $X = x_0 + x_1 + x_2 \mod M$, where M represents an integer which is not less than two. For example, secret sharing of an integer A is carried out as follows. (1) Random numbers $a_0$, $a_1$ each consisting of an integer, which is not less than 0 and is less than M, are generated. (2) $a_2 = A - a_0 - a_1$ is computed and the segments given as $(a_0, a_1)$, $(a_1, a_2)$, and $(a_2, a_0)$ are recorded in the first through the third computation devices in the split state.

Patent Literature 2 discloses a calculation device which performs bit addition of two bit-expressed integers with secure computation. As a method of secretly sharing an integer a belonging to a finite field $Z_q$ by N calculation devices, there is a method of using a (K−1)th-order polynomial $f\_a(x)$ (where K<N/2). In this method, for example, let $f\_a(0) = a$, and $f\_a(n)$ is distributed to the calculation devices. The distributed information $f\_a(n)$ is called a segment of the integer a. In this event, it is possible to solve the (K−1)th-order polynomial $f\_a(x)$ if K calculation devices cooperate with one another, and then it is possible to calculate $f\_a(0)$. In a case where segments of an addition result are secretly shared, in order to calculate a segment for $a+b \mod q$, the calculation devices calculate individually:

$$f\_{a+b}(n) = f\_a(n) + f\_b(n) \mod q.$$

Since individual calculation by each calculation device is sufficient, communication between the calculation devices is unnecessary.

CITATION LIST

Patent Literature(s)

PL 1: JP 2012-078446 A
PL 2: JP 2014-137740 A

Non Patent Literature(s)

NPL 1: Toshinori Araki, Jun Furukawa, Yehuda Lindell, Ariel Nof, Kazuma Ohara, "High-Throughput Semi-Honest Secure Three-Party Computation with an Honest Majority", ACM-CCS 2016

SUMMARY OF INVENTION

Technical Problem

The method described in Non Patent Literature 1 can compute addition and subtraction in a split state without requiring communication. In addition, this method can compute a product in a split state with little communication (each secure computation device transmits one value and receives one).

However, in the method disclosed in Non Patent Literature 1, computation of a product requires two multiplications and one division in each secure computation device. Although the division may be regarded as equivalent in cost to carrying out the multiplication if an inverse of 3 is regarded as a constant, the multiplication is heavy processing as compared with the addition and the subtraction and, therefore, desirably reduced.

In addition, the method disclosed in Non Patent Literature 1 has a problem that the method cannot be used in a modulus in which no inverse of 3 exists.

Patent Literature 1 merely discloses the secure computation system which records segments of an integer in a split state (shared information) and performs secure computation.

Patent Literature 2 merely discloses that each computation device performs a predetermined calculation individually when segments of an addition result are secretly shared.

It is an object of this invention to provide a numerical splitting device, a transmission information generating device, a secure computation device, method, a program recording medium, and a secure computation system, which can solve the above-mentioned problems.

Solution to Problem

A numerical splitting device according to this invention comprises an acquiring circuitry configured to acquire a numerical value w and a parameter p; a random numbers generating circuitry configured to generate a first random number r1 and a second random number r2 which are random and are equal to or more than zero but less than the parameter p; a random number computing circuitry configured to compute a third random number r3 based on the numerical value w, the parameter p, the first random number r1, and the second random number r2 in accordance with a mathematical expression $r3=w-r1-r2 \mod p$; a segments computing circuitry configured to compute first through third segments s1, s2, and s3 based on the first through the third random numbers r1, r2, and r3 and the parameter p in accordance with mathematical expressions $s1=r1+r2 \mod p$, $s2=r2+r3 \mod p$, and $s3=r3+r1 \mod p$; and a transmitting circuitry configured to transmit a pair of the first segment s1 and the second random number r2, a pair of the second segment s2 and the third random number r3, and a pair of the third segment s3 and the first random number r1 to first through third secure computation devices, respectively.

A numerical splitting method according to this invention includes acquiring a numerical value w and a parameter p; generating a first random number r1 and a second random number r2 which are random and are equal to or more than zero but less than the parameter p; computing a third random number r3 based on the numerical value w, the parameter p, the first random number r1, and the second random number r2 in accordance with a mathematical expression $r3=w-r1-r2 \mod p$; computing first through third segments s1, s2, and s3 based on the first through the third random numbers r1, r2, and r3 and the parameter p in accordance with mathematical expressions $s1=r1+r2 \mod p$, $s2=r2+r3 \mod p$, and $s3=r3+r1 \mod p$; and transmitting a pair of the first segment s1 and the second random number r2, a pair of the second segment s2 and the third random number r3, and a pair of the third segment s3 and the first random number r1 to first through third secure computation devices, respectively.

A program recording medium according to this invention is a program recording medium storing a numerical splitting program, wherein the numerical splitting program causes a computer to achieve a function of acquiring a numerical value w and a parameter p; a function of generating a first random number r1 and a second random number r2 which are random and are equal to or more than zero but less than the parameter p; a function of computing a third random number r3 based on the numerical value w, the parameter p, the first random number r1, and the second random number r2 in accordance with a mathematical expression $r3=w-r1-r2 \mod p$; a function of computing first through third segments s1, s2, and s3 based on the first through the third random numbers r1, r2, and r3 and the parameter p in accordance with mathematical expressions $s1=r1+r2 \mod p$, $s2=r2+r3 \mod p$, and $s3=r3+r1 \mod p$; and a function of transmitting a pair of the first segment s1 and the second random number r2, a pair of the second segment s2 and the third random number r3, and a pair of the third segment s3 and the first random number r1 to first through third secure computation devices, respectively.

Advantageous Effect of Invention

According to the present invention, it is possible to execute computation of a product by two multiplications in each secure computation device by using shared values generated in the manner described above.

BRIEF DESCRIPTION OF THE DRAWINGS

FIG. 10 is a block diagram for illustrating an example of an internal configuration of a shared information shaping device for use in the first secure computation device of the secure computation system illustrated in FIGS. 4 and 5 in detail.

DESCRIPTION OF EMBODIMENTS

Related Art

Figure 1:
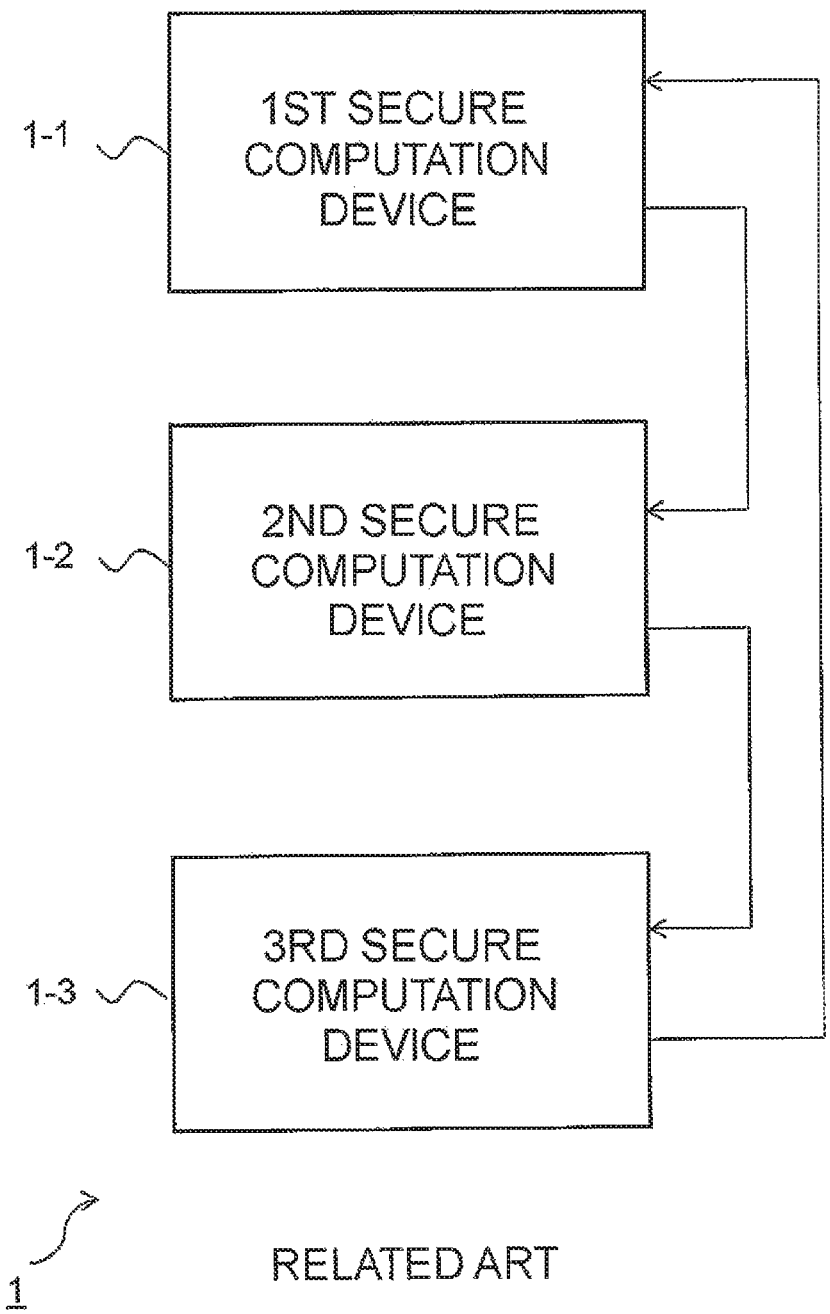
FIG. 1 is a block diagram for illustrating a configuration of a related secure computation system described in Non Patent Literature 1.

In order to facilitate an understanding of the present invention, a related art will be described by using a method described in the above-mentioned Non Patent Literature 1. As illustrated in FIG. 1, a secure computation system 1 realizing this method is executed by three secure computation devices. Herein, the three secure computation devices comprise a first secure computation device 1-1, a second secure computation device 1-2, and a third secure computation device 1-3, respectively.

It is assumed that the three secure computation devices 1-1 to 1-3 save, in a split state, a value w which is not less than zero and not more than $2^n-1$, where n represents an integer which is not less than one. Herein, $2^n-1$ represents 2 to the power of n−1. In this event, by using values (random numbers) which are randomly selected so as to satisfy a congruence equation:

$$r1+r2+r3 \equiv 0 \mod 2^n,$$

the value is processed as follows to be saved in the three secure computation devices 1-1 to 1-3. Herein, $\mod 2^n$ means that two integers are congruent to each other modulo $2^n$ and means that remainders obtained by dividing the integers by $2^n$ are equal to each other. Accordingly, the above-mentioned congruence equation indicates that the remainder obtained by dividing (r1+r2+r3) by $2^n$ is equal to zero.

The first secure computation device 1-1 saves, as shared values of w, (r1, r3−w mod $2^n$). The second secure computation device 1-2 saves, as shared values of w, (r2, r1−w mod $2^n$). The third secure computation device 1-3 saves, as shared values of w, (r3, r2−w mod $2^n$).

By cooperation of two secure computation devices among the three secure computation devices 1-1 to 1-3, it is possible to recover the value w. For instance, by using r1 from the first secure computation device 1-1 and r1−w mod $2^n$ from the second computation device 1-2, $$w = r1 + (r1-w) \bmod 2^n$$

can be computed. The same applies to other combinations. Hereinafter, description will proceed to addition (subtraction) processing and multiplication processing regarding such shared values.

[Addition (Subtraction) Processing]

Description will proceed to the addition processing executed regarding the above-mentioned value w and a value w' which are saved, in a split state, in the first secure computation device 1-1, the second secure computation device 1-2, and the third secure computation device 1-3 by means of the method described above.

First, description will be made as to what values are saved in the respective secure computation devices 1-1 to 1-3. It is assumed that r1, r2, and r3 are values (random numbers) which are randomly selected so as to satisfy:

$$r1 + r2 + r3 = 0 \bmod 2^n,$$

and r1', r2', and r3' are values (random numbers) which are randomly selected so as to satisfy:

$$r1' + r2' + r3' = 0 \bmod 2^n.$$

The first secure computation device 1-1 saves, as shared values of w, $$(s1, t1) = (r1, r3-w \bmod 2^n),$$

and saves, as shared values of w', $$(s1', t1') = (r1', r3'-w' \bmod 2^n).$$

The second secure computation device 1-2 saves, as shared values of w, $$(s2, t2) = (r2, r1-w \bmod 2^n),$$

and saves, as shared values of w', $$(s2', t2') = (r2', r1'-w' \bmod 2^n).$$

The third secure computation device 1-3 saves, as shared values of w, $(s3, t3) = (r3, r2-w \bmod 2^n)$, and saves, as shared values of w', $$(s3', t3') = (r3', r2'-w' \bmod 2^n).$$

The respective secure computation devices 1-1 to 1-3 carry out processing in accordance with the following procedure.

The first secure computation device 1-1 computes (s1", t1") by means of: $(s1", t1") = (s1+s1' \bmod 2^n, t1+t1' \bmod 2^n)$, and saves them as shared values of w+w'.

The second secure computation device 1-2 computes (s2", t2") by means of: $(s2", t2") = (s2+s2' \bmod 2^n, t2+t2' \bmod 2^n)$, and saves them as shared values of w+w'.

The third secure computation device 1-3 computes (s3", t3") by means of:

$$(s3", t3") = (s3+s3' \bmod 2^n, t3+t3' \bmod 2^n),$$

and saves them as shared values of w+w'.

The respective computed results can be considered to be obtained by sharing, by means of the above-mentioned method, $$w'' = w + w' \bmod 2^n.$$

It is possible to recover w" from those values. For instance, from the first secure computation device 1-1 and the second secure computation device 1-2, $$s1" = r1 + r1' \bmod 2^n,$$

and $$t2" = r1 + r1' - w - w' \bmod 2^n.$$

Then, $$s1" - t2" \bmod 2^n = w + w' \bmod 2^n$$

is obtained. The same applies to other combinations of the secure computation devices.

A method of subtraction is similar to that of the addition.

[As regards Multiplication Processing]

Description will proceed to the multiplication processing executed regarding the above-mentioned value w and a value w' which are saved, in the split state, in the first secure computation device 1-1, the second secure computation device 1-2, and the third secure computation device 1-3 by means of the method described above.

First, description will be made as to what values are saved in the respective secure computation devices 1-1 to 1-3. It is assumed that r1, r2, and r3 are values (random numbers) which are randomly selected so as to satisfy:

$$r1 + r2 + r3 = 0 \bmod 2^n,$$

and r1', r2', and r3' are values (random numbers) which are randomly selected so as to satisfy:

$$r1' + r2' + r3' = 0 \bmod 2^n.$$

The first secure computation device 1-1 saves, as shared values of w, $$(s1, t1) = (r1, r3-w \bmod 2^n),$$

and saves, as shared values of w', $$(s1', t1') = (r1', r3'-w' \bmod 2^n).$$

The second secure computation device 1-2 saves, as shared values of w, $$(s2, t2) = (r2, r1-w \bmod 2^n),$$

and saves, as shared values of w', $$(s2', t2') = (r2', r1'-w' \bmod 2^n).$$

The third secure computation device 1-3 saves, as shared values of w, $$(s3, t3) = (r3, r2-w \bmod 2^n),$$

and saves, as shared values of w', $$(s3', t3') = (r3', r2'-w' \bmod 2^n).$$

The respective secure computation devices 1-1 to 1-3 carry out processing in accordance with the following procedure.

It is assumed that, as values randomly selected so as to satisfy:

$$r1" + r2" + r3" = 0 \bmod 2^n,$$

the first secure computation device 1-1 saves r1", the second secure computation device 1-2 saves r2", and the third secure computation device 1-3 saves r3". The values r1", r2", and r3" satisfying such a property are required for one time use every time when multiplication is carried out. A method of efficiently generating such three values by using the three secure computation devices 1-1 to 1-3 will later be described.

The first secure computation device 1-1 computes:

$$u1=(t1t'1-s1s1'+r1'')/3 \bmod 2^n,$$

and delivers u1 to the second secure computation device 1-2. Herein, /3 means an inverse of 3 and indicates a value which becomes equal to one when multiplied by 3.

The second secure computation device 1-2 computes:

$$u2=(t2t'2-s2s2'+r2'')/3 \bmod 2^n,$$

and delivers u2 to the third secure computation device 1-3.

The third secure computation device 1-3 computes:

$$u3=(t3t'3-s3s3'+r3'')/3 \bmod 2^n,$$

and delivers u3 to the first secure computation device 1-1.

The first secure computation device 1-1 computes:

$$(s1'',t1'')=(u3-u1 \bmod 2^n,-2u3-u1 \bmod 2^n),$$

and saves (s1", t1") as shared values of ww'.

The second secure computation device 1-2 computes:

$$(s2'',t2'')=(u1-u2 \bmod 2^n,-2u1-u2 \bmod 2^n),$$

and saves (s2", t2") as shared values of ww'.

The third secure computation device 1-3 computes:

$$(s3'',t3'')=(u2-u3 \bmod 2^n,-2u2-u3 \bmod 2^n),$$

and saves (s3", t3") as shared values of ww'.

First it can be confirmed that:

$$\begin{aligned}u1+u2+u3\\=(t1t'1-s1s1'+t2t2'-s2s2'+\\t3t3'-s3s3+r1''+\\r2''+r3'')/3 \bmod 2^{\wedge}n\\=(3ww'-(r1+r2+r3)w'-(r1'+r2'+r3')w+\\r1''+r2''+r3'')/3 \bmod 2^{\wedge}n\\=ww' \bmod 2^{\wedge}n.\end{aligned}$$

Since $2^n$ and 3 are relatively prime to each other, it is certainly possible to compute the inverse of 3 on mod $2^n$.

Since $$\begin{aligned}s1''-t2''\\=u3-u1+2u1+u2\\=u1+u2+u3\\=ww' \bmod 2^{\wedge}n,\end{aligned}$$

it is understood that ww' mod $2^n$ can be calculated with the similar computation method by using the values saved in the first secure computation device 1-1 and the second secure computation device 1-2. The same applies to other combinations of the secure computation devices.

[As regards Generation of Random Numbers]

New, description will proceed to a method of generating, in a large amount, values such that a sum of three values becomes 0 as given by:

$$r1+r2+r3=0 \bmod 2^n,$$

without communication among the first secure computation device 1-1, the second secure computation device 1-2, and the third computation device 1-3 and according to a method such that the values held in each secure computation device are not known to other secure computation devices. Herein, description will proceed to a method of generating, with respect to a lot of i=1, . . . , N, r[i, 1], r[i, 2], and r[i, 3] which satisfy:

$$r[i,1]+r[i,2]+r[i,3]=0 \bmod 2^n.$$

PRG represents a pseudo-random number generator for generating a train of numerical values, each consisting of n bits, in response to a key and an index. The index may be a counter or the like.

First, first through third keys L1, L2, and L3 of the PRG are generated as setup processing of the secure computation devices. It is assumed that the first key L1 and the third key L3 are stored in the first secure computation device 1-1, the second key L2 and the first key L1 are stored in the second secure computation device 1-2, and the third key L3 and the second key L2 are stored in the third secure computation device 1-3.

It is assumed that the respective secure computation devices 1-1 to 1-3 share an index idx which is synchronized by a counter or the like.

In the first secure computation device 1-1, the first key L1 and the index idx are supplied to the PRG to generate, as an output thereof, a numerical value r'[1] of n bits. Furthermore, in the first secure computation device 1-1, the third key L3 and the index idx are supplied to the PRG to generate, as an output thereof, a numerical value r'[3] of n bits. Then, the first secure computation device 1-1 lets:

$$r[1]=r'[1]-r'[3] \bmod 2^n.$$

In the second secure computation device 1-2, the second key L2 and the index idx are supplied to the PRG to generate, as an output thereof, a numerical value r'[2] of n bits. Furthermore, in the second secure computation device 1-2, the first key L1 and the index idx are supplied to the PRG to generate, as an output thereof, a numerical value r'[1] of n bits. Then, the second secure computation device 1-2 lets:

$$r[2]=r'[2]-r'[1] \bmod 2^n.$$

In the third secure computation device 1-3, the third key L3 and the index idx are supplied to the PRG to generate, as an output thereof, a numerical value r'[3] of n bits. Furthermore, in the third secure computation device 1-3, the second key L2 and the index idx are supplied to the PRG to generate, as an output thereof, a numerical value r'[2] of n bits. Then, the third secure computation device 1-3 lets:

$$r[3]=r'[3]-r'[2] \bmod 2^n.$$

Since $$\begin{aligned}r[1]+r[2]+r[3]\\=r'[1]-r'[3]+r'[2]-r'[1]+r'[3]-r'[2]=\\0 \bmod 2^{\wedge}n,\end{aligned}$$

all of N sets satisfy a condition. Focusing attention to a value:

$$r[1]=r'[1]-r'[3] \bmod 2^n$$

which is generated by the first secure computation device 1-1, the third secure computation device 1-3 cannot obtain r'[1] and the second secure computation device 1-2 cannot obtain r'[3]. Therefore, it is understood that the third secure computation device 1-3 and the second secure computation device 1-2 cannot compute r[1]. The same applies to r[2] and r[3].

If the setup processing is finished, the above-mentioned processing can be executed even before the computation is carried out.

As described above, in the related art, computation of a produce requires two multiplications and one division in each secure computation device.

EXAMPLE EMBODIMENT

Figure 2:
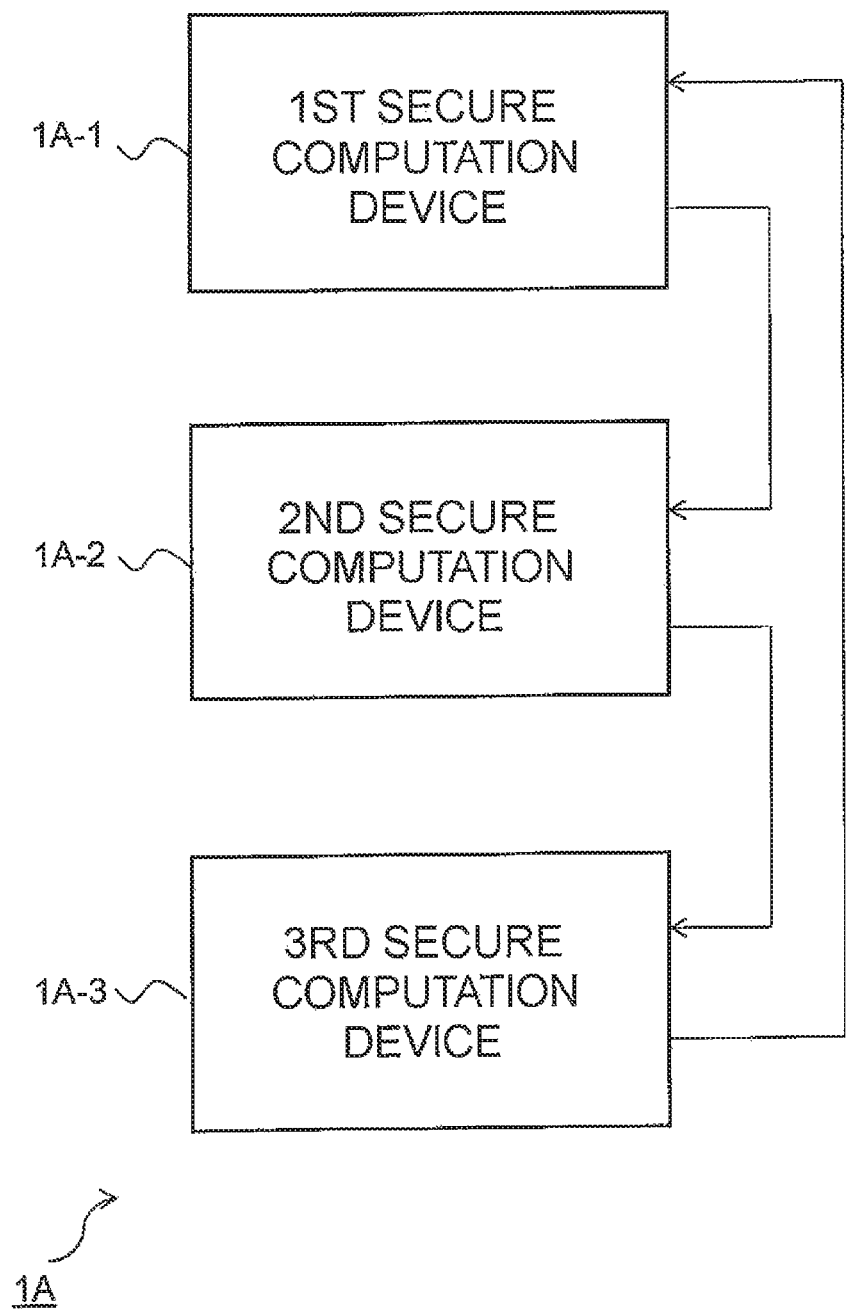
FIG. 2 is a block diagram for illustrating a configuration of a secure computation system according to an example embodiment of the present invention.

Now, an example embodiment of the present invention will be described. As illustrated in FIG. 2, a secure computation system 1A realizing a method according to this example embodiment is executed by three secure computation devices. It is assumed that the three secure computation devices comprise a first secure computation device 1A-1, a second secure computation device 1A-2, and a third secure computation device 1A-3, respectively.

It is assumed that the three secure computation devices 1A-1 to 1A-3 save, in a split state, a value w which is not less than zero and not more than p−1, where p represents an integer which is not less than one. In this event, the value is saved after being processed in the following manner by using values (random numbers) which are randomly selected so as to satisfy an equation:

$$r1+r2+r3=w \bmod p.$$

The first through the third random numbers r1, r2, and r3 can be generated by randomly selecting r1 and r2 and thereafter calculating:

$$r3=w-r1-r2 \bmod p.$$

The first secure computation device 1A-1 saves, as shared values of w, (r1+r2 mod p, r2). The second secure computation device 1A-2 saves, as shared values of w, (r2+r3 mod p, r3). The third secure computation device 1A-3 saves, as shared values of w, (r3+r1 mod p, r1).

By cooperation of two secure computation devices among the three secure computation devices 1A-1 to 1A-3, it is possible to recover w. For instance, by using r1+r2 mod p from the first secure computation device 1A-1 and r3 from the second computation device 1A-2, $$w=r1+r2+r3 \bmod p$$

can be computed. The same applies to other combinations. Next, description will proceed to addition (subtraction) processing and multiplication processing regarding such shared values.

[Addition (Subtraction) Processing]

Description will proceed to the addition processing executed regarding the above-mentioned value w and a value w' which are saved in the first secure computation device 1A-1, the second secure computation device 1A-2, and the third secure computation device 1A-3 by means of the method described above.

First, description will be made as to what values are saved in the respective secure computation devices 1A-1 to 1A-3. It is assumed that r1, r2, and r3 are values which are randomly selected so as to satisfy:

$$r1+r2+r3=w \bmod p,$$

and r1', r2', and r3' are values which are randomly selected so as to satisfy:

$$r1'+r2'+r3'=w \bmod p.$$

The first secure computation device 1A-1 saves, as shared values of w, $$(s,t1)=(r1+r2 \bmod p, r2),$$

and saves, as shared values of w', $$(s1',t1')=(r1'+r2' \bmod p, r2').$$

The second secure computation device 1A-2 saves, as shared values of w, $$(s2,t2)=(r2+r3 \bmod p, r3),$$

and saves, as shared values of w', $$(s2',t2')=(r2'+r3' \bmod p, r3').$$

The third secure computation device 1A-3 saves, as shared values of w, $$(s3,t3)=(r3+r1 \bmod p, r1),$$

and saves, as shared values of w', $$(s3',t3')=(r3'+r1' \bmod p, r1').$$

The respective secure computation devices carry out processing in accordance with the following procedure.

The first secure computation device 1A-1 computes (s1", t1") by means of:

$$(s1'',t1'')=(s1+s1' \bmod p, t1+t1' \bmod p),$$

and saves them as shared values of w+w'.

The second secure computation device 1A-2 computes (s2", t2") by means of:

$$(s2'',t2'')=(s2+s2' \bmod p, t2+t2' \bmod p),$$

and saves them as shared values of w+w'.

The third secure computation device 1A-3 computes (s3", t3") by means of:

$$(s3'',t3'')=(s3+s3' \bmod p, t3+t3' \bmod p),$$

and saves them as shared values of w+w'.

This processing is similar to the method of the above-mentioned Non Patent Literature 1.

The respective computed results have a characteristic similar to that in a case where $$w''=w+w' \bmod p$$

is split by means of the above-mentioned method. From the first secure computation device 1A-1 and the second secure computation device 1A-2, $$s1''=r1+r2+r1'+r2' \bmod p,$$

and $$t2''=r3+r3' \bmod p.$$

Then, $$s1''+t2'' \bmod p=r1+r2+r3+r1'+r2'+r3' \bmod p=w+w' \bmod p$$

is obtained. The same applies to other combinations of the secure computation devices.

A method of subtraction is similar to that of the addition.

[As regards Multiplication Processing]

Description will proceed to the multiplication processing executed regarding the above-mentioned value w and a value w' which are saved, in the split state, in the first secure computation device 1A-1, the second secure computation device 1A-2, and the third secure computation device 1A-3 by means of the method described above.

First, description will be made as to what values are saved in the respective secure computation devices. It is assumed that r1, r2, and r3 are values which are randomly selected so as to satisfy:

$$r1+r2+r3=w \bmod p,$$

and r1', r2', and r3' are values which are randomly selected so as to satisfy:

$$r1'+r2'+r3'=w' \bmod p.$$

The first secure computation device 1A-1 saves, as shared values of w, $$(s,t1)=(r1+r2 \bmod p, r2),$$

and saves, as shared values of w', $$(s1',t1')=(r1'+r2' \bmod p, r2').$$

The second secure computation device 1A-2 saves, as shared values of w, $$(s2,t2)=(r2+r3 \bmod p, r3),$$

and saves, as shared values of w', $$(s2',t2')=(r2'+r3' \bmod p, r3').$$

The third secure computation device 1A-3 saves, as shared values of w, $$(s3,t3)=(r3+r1 \bmod p, r1),$$

and saves, as shared values of w', $$(s3',t3')=(r3'+r1' \bmod p, r1').$$

That is, the method according to this example embodiment and the method described in Non Patent Literature 1 are different in a stage when the value is split.

The respective secure computation devices 1A-1 to 1A-3 carry out processing in accordance with the following procedure.

It is assumed that, as values randomly selected so as to satisfy:

$$r1''+r2''+r3''=0 \bmod p,$$

the first secure computation device 1A-1 saves r1'', the second secure computation device 1A-2 saves r2'', and the third secure computation device 1A-3 saves r3''. The values r1'', r2'', and r3'' satisfying such a property are required for one time use every time when multiplication is carried out.

The first secure computation device 1A-1 computes:

$$u1=t1t'1-s1s1'+r1'' \bmod p,$$

and delivers first transmission information u1 to the second secure computation device 1A-2.

The second secure computation device 1A-2 computes:

$$u2=t2t'2-s2s2'+r2'' \bmod p,$$

and delivers second transmission information u2 to the third secure computation device 1A-3.

The third secure computation device 1A-3 computes:

$$u3=t3t'3-s3s3'+r3'' \bmod p,$$

and delivers third transmission information u3 to the first secure computation device 1A-1.

The first secure computation device 1A-1 computes:

$$(s1'',t1'')=(u1+u3 \bmod p, u1),$$

and saves (s1'', t1'') as shared values of ww'.

The second secure computation device 1A-2 computes:

$$(s2'',t2'')=(u1+u2 \bmod p, u2),$$

and saves (s2'', t2'') as shared values of ww'.

The third secure computation device 1A-3 computes:

$$(s3'',t3'')=(u2+u3 \bmod p, u3),$$

and saves (s3'', t3'') as shared values of ww'.

First, it can be confirmed that:

$$\begin{aligned}
u1 &+ u2 + u3 \\
&= (t1t1' - s1s1' + t2t2' - s2s2' + \\
&\qquad t3t3' - s3s3 + r1'' + r2'' + r3'') \bmod 2^{\wedge}n \\
&= (r1 + r2)(r1' + r2') - r2r2' + (r2 + r3)(r2' + r3') - r2r3' + \\
&\qquad (r3 + r1)(r3' + r1') - r1r1' + \\
&\qquad\qquad r1'' + r2'' + r3'' \bmod 2^{\wedge}n \\
&= r1r1' + r1r2' + r1'r2 + r2r2' + r2r3' + r2'r3 + r3r3' + r3r1' + \\
&\qquad\qquad r3'r1 \bmod 2^{\wedge}n \\
&= (r1 + r2 + r3)(r1' + r2' + r3') \bmod 2^{\wedge}n \\
&= ww' \bmod 2^{\wedge}n.
\end{aligned}$$

Since $$s1''+t2''=u1+u3+u2=u1+u2+u3=ww' \bmod p,$$

it is understood that ww' mod p can be computed with the similar computation method by using the values saved in the first secure computation device 1A-1 and the second secure computation device 1A-2. The same applies to other combinations of the secure computation devices.

Effect of Example Embodiment

According to the above-mentioned method, computation of a product is executed by two multiplications in each secure computation device. Accordingly, the method of this example embodiment is efficient by one multiplication as compared with the method described in Non Patent Literature 1. Further, there is no calculation requiring an inverse and it is possible to utilize the method without selecting a modulus.

Differences between the method of the example embodiment and the method described in Non Patent Literature 1 reside in a method of splitting a numerical value and a method of multiplication related to shared numerical values but a method of addition/subtraction is quite same in both of the methods. Configuration and operation of the example embodiment will be described referring to the drawings.

Now, the description will proceed to the configuration of the example embodiment according to this invention with reference to the drawings.

Figure 3:
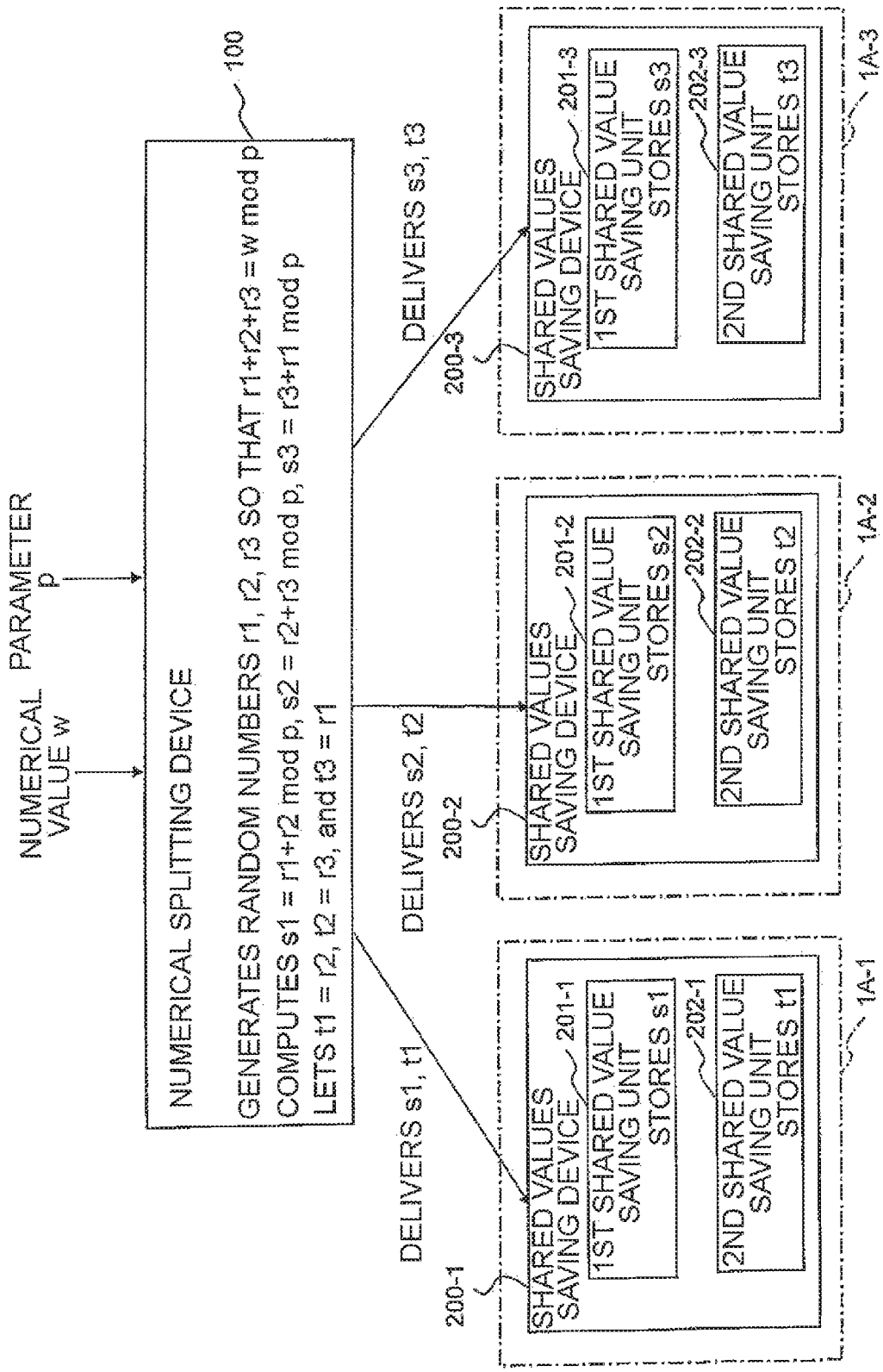
FIG. 3 is a block diagram for illustrating a relationship between a numerical splitting device according to an example embodiment of the present invention and first through third secure computation devices.

FIG. 3 is a block diagram for illustrating a configuration of a numerical splitting device 100 according to an example embodiment of the present invention. Referring to FIG. 3, the numerical splitting device 100 of the example embodiment of the present invention is a device for splitting a numerical value to the three secure computation devices 1A-1, 1A-2, and 1A-3. The first through the third secure computation devices 1A-1, 1A-2, and 1A-3 comprise first through third shared values saving devices 200-1, 200-2, and 200-3 for saving shared values, respectively.

Each shared values saving device 200 comprises a first shared value saving unit 201 and a second shared value saving unit 202.

The numerical splitting device 100 is supplied with a numerical value w and a parameter p and causes the three shared values saving devices 200 to store the shared values.

As described above, the three shared values saving devices 200 comprise the first shared values saving device 200-1, the second shared values saving device 200-2, and the third shared values saving device 200-3. In addition, in an i-th shared values saving device 200-1, a first shared value saving unit is depicted at 201-1 and a second shared value saving unit is depicted at 202-1. Herein, i=1, 2, and 3.

Specifically, the numerical splitting device 100 is supplied with the numerical value w and the parameter p and generates first and second random numbers r1 and r2 each of which is equal to or more than zero and is equal to or less than (p−1). Subsequently, the numerical splitting device 100 computes a third random number r3 in accordance with the following mathematical expression:

$$r3 = w - r1 - r2 \bmod p.$$

Subsequently, the numerical splitting device 100 computes first through third segments s1, s2, and s3 in accordance with the following mathematical expressions:

$$s1 = r1 + r2 \bmod p;$$

$$s2 = r2 + r3 \bmod p; \text{ and}$$

$$s3 = r3 + r1 \bmod p.$$

Then, the numerical splitting device 100 lets t1=r2, t2=r3, and t3=r1, and, for i=1, 2, and 3, causes the first shared value saving unit 201-1 to store si, and causes the second shared value saving unit 202-1 to store ti.

Figure 4:
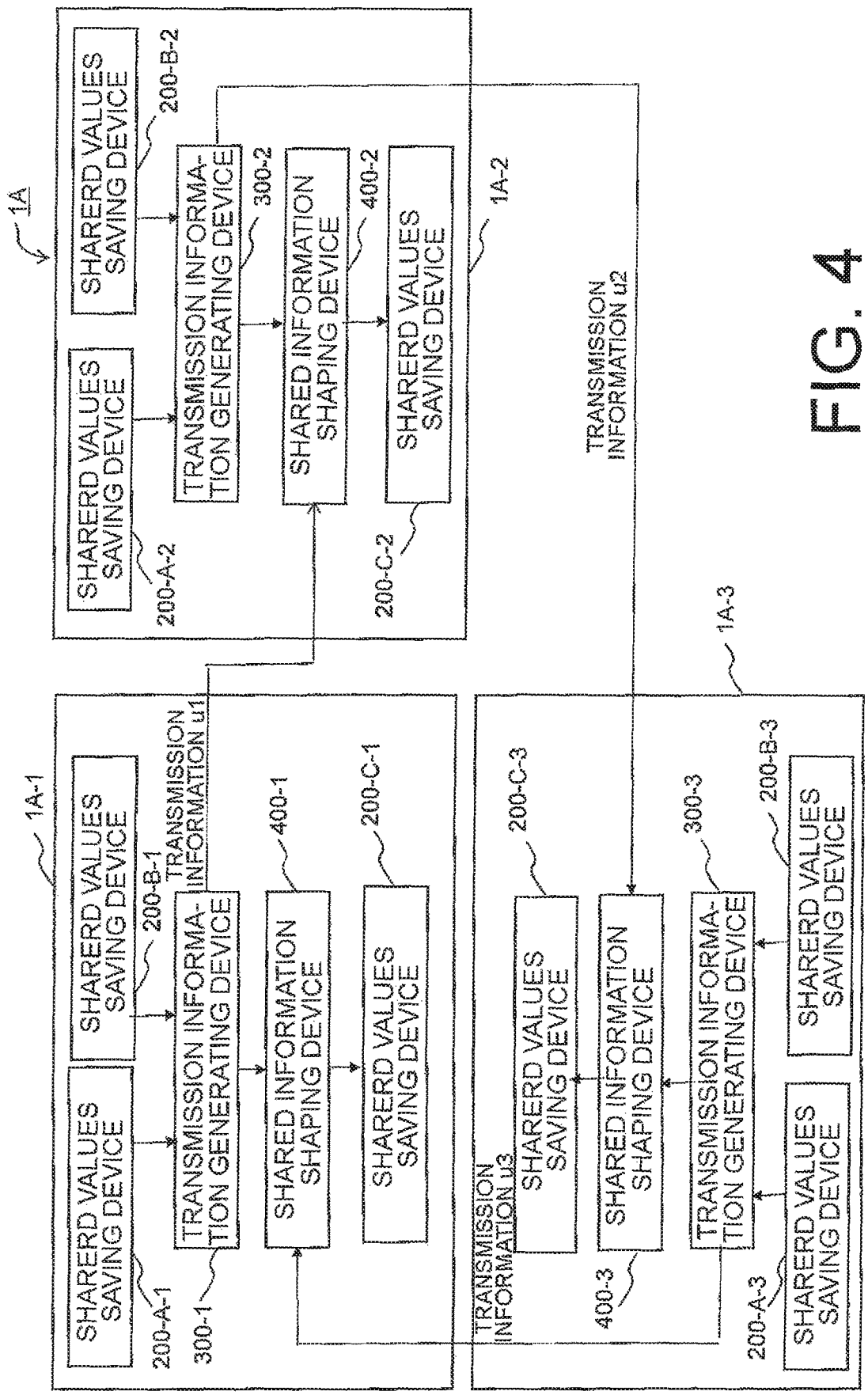
FIG. 4 is a block diagram for illustrating a configuration of the secure computation system according to the example embodiment when the first through the third secure computation devices execute multiplication relating to two shared values and hold resultant shared values.
Figure 5:
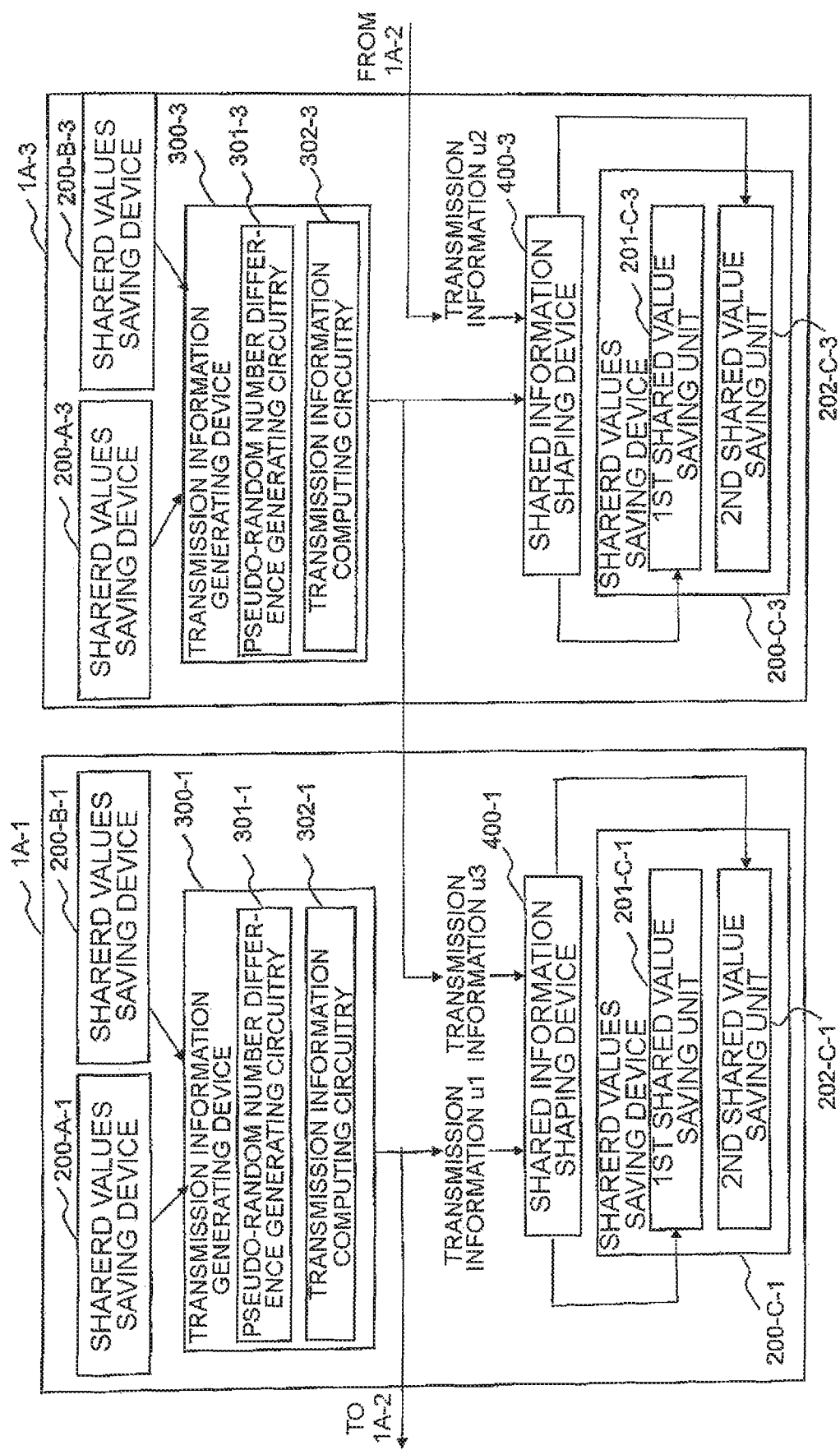
FIG. 5 is a block diagram for illustrating an example of internal configurations of the first and the third secure computation devices in FIG. 4 in detail.

Referring to FIGS. 4 and 5, description will proceed to a configuration of the secure computation system 1A according to the example embodiment of the present invention. The illustrated secure computation system 1A is a system for executing multiplication processing.

As shown in FIG. 4, the secure computation system 1A comprises the first through the third secure computation devices 1A-1, 1A-2, and 1A-3. Each of the first through the third secure computation devices 1A-1, 1A-2, and 1A-3 has a similar configuration. Accordingly, hereinafter, description will be mainly made as regards the first secure computation device 1A-1.

The first secure computation device 1A-1 comprises first through third shared values saving devices 200-A-1, 200-B-1, and 200-C-1, a transmission information generating device 300-1, and a shared information shaping device 400-1.

The first shared values saving device 200-A-1 saves, as shared values of a numerical value wA, a value sA1 and a value tB1. The second shared values saving device 200-B-1 saves, as shared values of a numerical value wB, a value sB1 and a value tB1.

FIG. 5 is a block diagram for illustrating internal configurations of the first secure computation device 1A-1 and the third secure computation device 1A-3 in FIG. 4 in detail.

The transmission information generating device 300-1 is supplied with the value sA1 and the value tA1 which are stored in the first shared value saving unit and the second shared value saving unit of the first shared values saving device 200-A-1, respectively, with the value sB1 and the value tB1 which are stored in the first shared value saving unit and the second shared value saving unit of the second shared values saving device 200-B-1, respectively, and with an index j. The transmission information generating device 300-1 comprises a pseudo-random number difference generating circuitry 301-1 and a transmission information computing circuitry 302-1, and produces transmission information u1.

The pseudo-random number difference generating circuitry 301-1 stores two keys K1 and K2 each consisting of a pseudo-random number and is supplied with the index j and the parameter p. The pseudo-random number difference generating circuitry 301-1 computes rK1' by supplying a pseudo-random function with the key K1 and the index j, computes rK2' by supplying the pseudo-random function with the key K2 and the index j, and produces:

$$r = rK1' - rK2' \bmod p.$$

The transmission information computing circuitry 302-1 is supplied with sA, sB1, tA1, tB1, r, and p, and computes tA1tB1−sA1sB+r mod p to obtain first transmission information u1.

Turning back to FIG. 4, the second secure computation device 1A-2 comprises first through third shared values saving devices 200-A-2, 200-B-2, and 200-C-2, a transmission information generating device 300-2, and a shared information shaping device 400-2. Likewise, the third secure computation device 1A-3 comprises first through third shared values saving devices 200-A-3, 200-B-3, and 200-C-3, a transmission information generating device 300-3, and a shared information shaping device 400-3.

In the second secure computation device 1A-2, the first shared values saving device 200-A-2 saves a value sA2 and a value tA2 while the second shared values saving device 200-B-2 saves a value sB2 and a value tB2. In the third secure computation device 1A-3, the first shared values saving device 200-A-3 saves a value sA3 and a value tA3 while the second shared values saving device 200-B-3 saves a value sB3 and a value tB3.

As shown in FIG. 5, the transmission information generating device 300-3 of the third secure computation device 1A-3 comprises a pseudo-random number difference generating circuitry 301-3 and a transmission information computing circuitry 302-3, and produces third transmission information u3.

In the first secure computation device 1A-1, the shared information shaping device 400-1 is supplied with the first transmission information u1 and the third transmission information u3 which are computed by the two transmission information generating devices 300-1 and 300-3, and with p. Subsequently, the shared information shaping device 400-1 computes s which is represented by the following mathematical expression:

$$s = u1 + u3 \bmod p.$$

Then, the shared information shaping device 400-1 causes the first shared value saving unit 201-C-1 of the third shared values saving device 200-C-1 to store s and causes the second shared value saving unit 202-C-1 to store u1.

Now, description will proceed to the operation of the example embodiment of the present invention with reference to the drawings.

FIG. 4 is a diagram for illustrating a configuration of the example embodiment when executing multiplication related to shared values of two numerical values wA and wB shared in the three secure computation devices 1A-1, 1A-2, and 1A-3 and saving resultant shared values.

Herein, a shared values saving device 200-X-i represents that an i-th one of shares relating to a value X is stored. A*B is computed in a split state and saved in a shared values saving device 200-C-i.

The transmission information generating device 300-$i$ delivers the transmission information to the transmission information generating device 300-$i$+1 and the shared information shaping device 400-$i$. In a case where i+1=4, it is replaced with 1.

Figure 6:
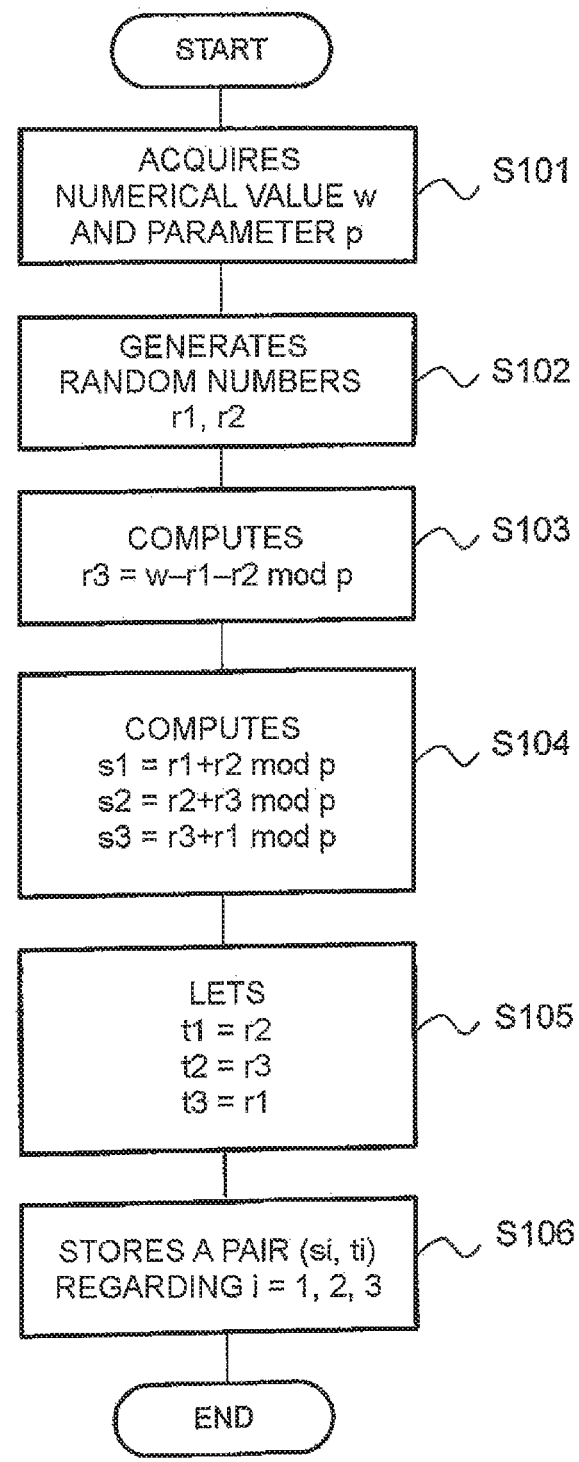
FIG. 6 is a flow chart for illustrating an operation of splitting a numerical value by the numerical splitting device illustrated in FIG. 3.

FIG. 6 is a flow chart for illustrating an operation of the example embodiment in which a numerical value is split in the present invention.

First, the numerical splitting device 100 is supplied with the numerical value w and the parameter p (step S101).

Next, the numerical splitting device 100 generates two random numbers r1 and r2 (step S102), and computes r3=w−r1−r2 mod p (step S103).

Next, the numerical splitting device 100 computes s1=r1+r2 mod p, s2=r2+r3 mod p, and s3=r3+r1 mod p (step S104). Further, the numerical splitting device 100 assumes t1=r2, t2=r3, and t3=r1 (step S105).

Next, as regards i=1, 2, and 3, the numerical splitting device 100 causes the first shared value saving unit 201-$i$ to store si and causes the second shared value saving unit 202-$i$ to store ti (step S106).

Figure 7:
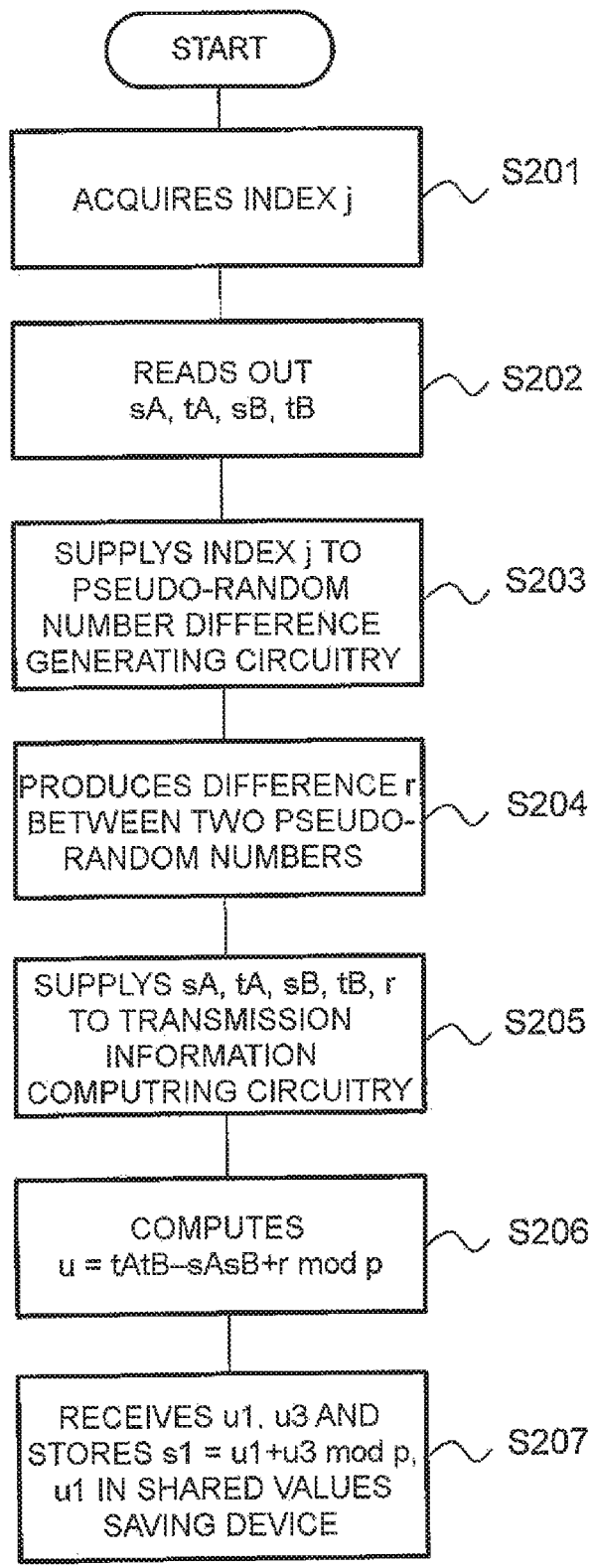
FIG. 7 is a flow chart for illustrating an operation of executing multiplication in the secure computation system illustrated in FIGS. 4 and 5.

FIG. 7 is a flow chart for illustrating an operation of the example embodiment until the transmission information generating device 300 and the shared information shaping device 400 in the example embodiment of the present invention execute multiplication related to the values shared in the first shared values saving device 200-A and the second shared values saving device 200-B and cause the third shared values saving device 200-C to store a resultant value.

First, the transmission information generating device 300 is supplied with an index j (step S201).

Next, the transmission information generating device 300 reads out the values sA and tA stored in the first and the second shared value saving units 201-A and 202-A of the first shared values saving device 200-A, and the values sB and tB stored in the first and the second shared value saving units 201-B and 202-B of the second shared values saving device 200-B (step S202).

Next, the transmission information generating device 300 supplies the index j to the pseudo-random number difference generating circuitry 301 (step S203).

The pseudo-random number difference generating circuitry 301 generates two pseudo-random numbers in accordance with the index j to produce a difference r therebetween (step S204).

Next, the transmission information generating device 300 supplies sA, tA, sB, tB, and r to the transmission information computing circuitry 302 (step S205).

The transmission information computing circuitry 302 computes, as the transmission information u, u=tAtB−sAsB+r mod p and supplies it to the two shared information shaping devices 400 (step S206).

The shared information shaping device 400 receives two pieces of the transmission information u1 and u3 and causes the third shared values saving device 200-C to store $s = u1 + u3 \bmod p$ and u1 (step S207).

According to this invention, it is possible to compute any polynomial expression on mod p in a state where data are split in a plurality of secure computation devices and concealed in the respective secure computation devices. Furthermore, a communication amount and a computation amount required by this computation are small. This contributes, when any service is offered while secret data are dealt with at a secure computation device, to prevent an administrator of the secure computation device from stealing the data. This is because, if a plurality of secure computation devices are assigned to different administrators, no administrator can check data in all of the secure computation devices by oneself. This contributes to prevent stealing data via such an administrator.

EXAMPLES

Figure 8:
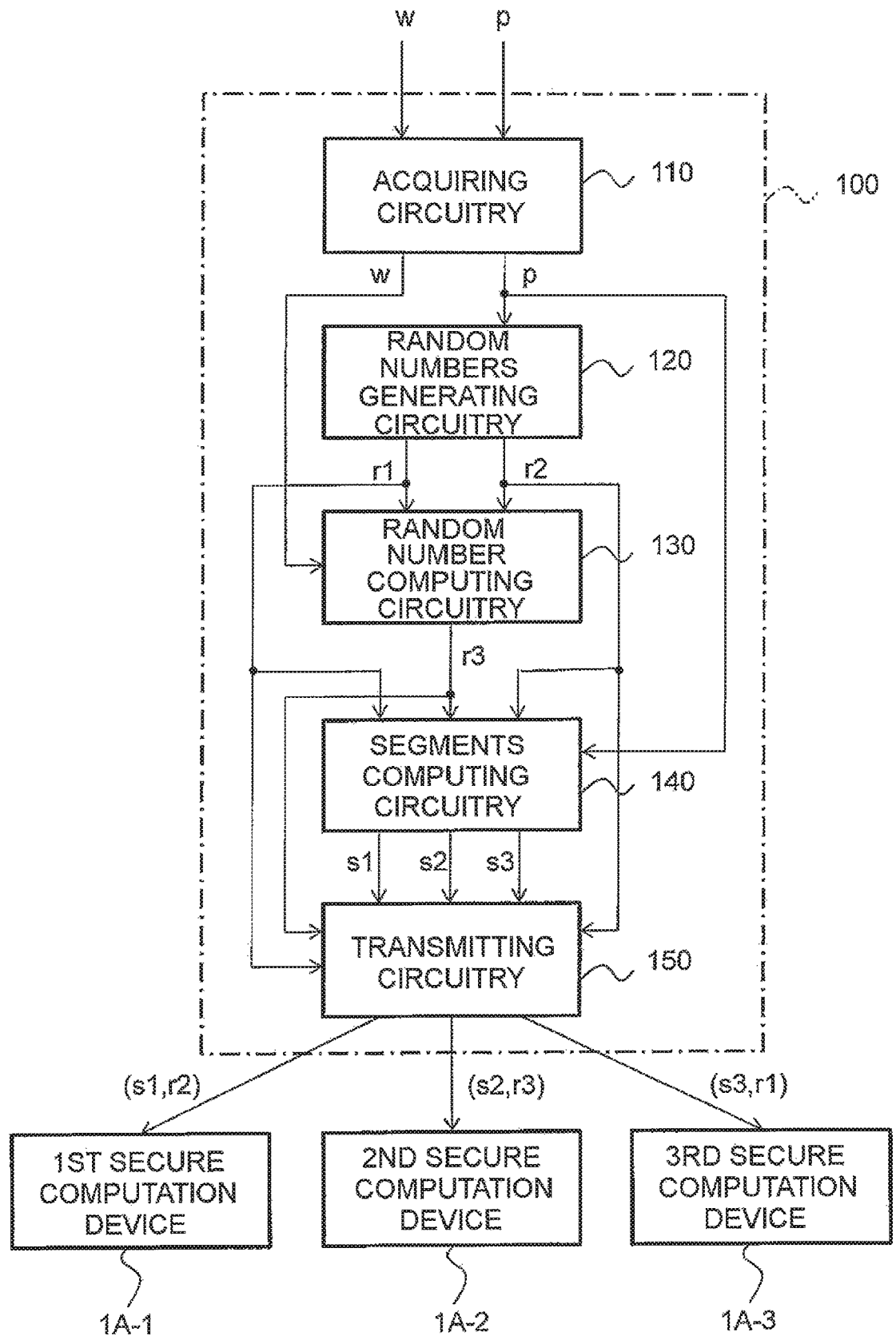
FIG. 8 is a block diagram for illustrating an example of an internal configuration of the numerical splitting device illustrated in FIG. 3 in detail.

FIG. 8 is a block diagram for illustrating an example of configuration of the numerical splitting device 100. The numerical splitting device 100 comprises an acquiring circuitry 110, a random numbers generating circuitry 120, a random number computing circuitry 130, a segments computing circuitry 140, and a transmitting circuitry 150.

The acquiring circuitry 110 acquires a numerical value w and a parameter p. The random numbers generating circuitry 120 generates a first random number r1 and a second random number r2 each of which is random and is equal to or more than zero but less than the parameter p. The random number computing circuitry 130 computes a third random number r3 based on the numerical value w, the parameter p, the first random number r1, and the second random number r2 in accordance with a mathematical expression r3=w−r1−r2 mod p.

The segments computing circuitry 140 computes first through third segments s1, s2, and s3 based on the first through the third random numbers r1, r2, and r3 and the parameter p in accordance with mathematical expressions s1=r1+r2 mod p, s2=r2+r3 mod p, and s3=r3+r1 mod p. The transmitting circuitry 150 transmits a pair (s1, r2) of the first segment s1 and the second random number r2, a pair (s2, r3) of the second segment s2 and the third random number r3, and a pair (s3, r1) of the third segment s3 and the first random number r1 to the first through the third secure computation devices 1A-1, 1A-2, and 1A-3, respectively.

It is assumed that t1=r2, t2=r3, and t3=r1. In this event, the first secure computation device 1A-1 saves a pair (s1, t1) as shared values of the numerical value w, the second secure computation device 1A-2 saves a pair (s2, t2) as shared values of the numerical value w, and the third secure computation device 1A-3 saves a pair (s3, t3) as shared values of the numerical value w.

In a similar configuration, it is assumed that the numerical splitting device 100 is supplied with a numerical value w' and the parameter p. In this event, first through third random numbers r1', r2', and r3' are obtained by using the random numbers generating circuitry 120 and the random number computing circuitry 130. Accordingly, in this event, the first secure computation device 1A-1 saves a pair (s', t1') as shared values of the numerical value w', the second secure computation device 1A-2 saves a pair (s2', t2') as shared values of the numerical value w', and the third secure computation device 1A-3 saves a pair (s3', t3') as shared values of the numerical value w'.

Figure 9:
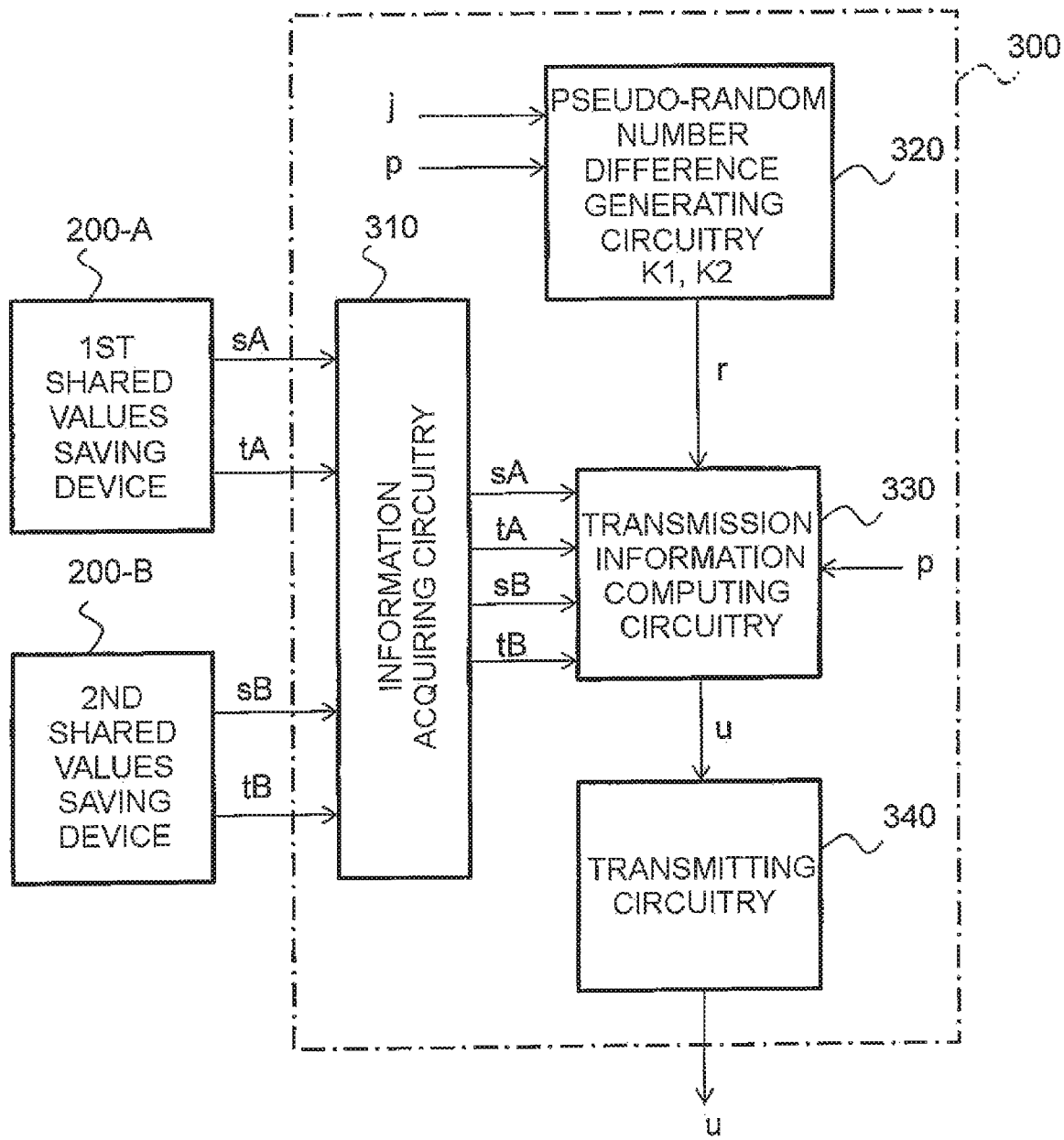
FIG. 9 is a block diagram for illustrating an example of an internal configuration of a transmission information generating device for use in the secure computation device of the secure computation system illustrated in FIGS. 4 and 5 in detail.

FIG. 9 is a block diagram for illustrating an example of configuration of the transmission information generating device 300. The transmission information generating device 300 comprises an information acquiring circuitry 310, a pseudo-random number difference generating circuitry 320, a transmission information computing circuitry 330, and a transmitting circuitry 340.

The information acquiring circuitry 310 is connected to a first shared values saving device 200-A and to a second shared values saving device 200-B. The first shared values saving device 200-A saves numerical values sA and tA as shared values of the numerical value wA. The second shared values saving device 200-B saves numerical values sB and tB as shared values of the numerical value wB. The information acquiring circuitry 310 acquires the numerical values sA and tA from the first shared values saving device 200-A and acquires the numerical values sB and tB from the second shared values saving device 200-B.

The pseudo-random number difference generating circuitry 320 stores keys K1 and K2 and is supplied with an index j and a parameter p. The pseudo-random number difference generating circuitry 320 generates two pseudo-random numbers using the keys K1 and K2 and the index j and computes and produces a difference r based on the generated two pseudo-random numbers and the parameter p.

The transmission information computing circuitry 330 is supplied with the numerical values sA, tA, sB, and tB, the difference r, and the parameter p. The transmission information computing circuitry 330 computes, as transmission information u, $$u = tAtB - sAsB + r \bmod p.$$

The transmitting circuitry 340 transmits the transmission information u to two shared information shaping devices 400.

FIG. 10 is a block diagram for illustrating an example of configuration of the shared information shaping device 400-1 used in the first secure computation device 1A-1. The shared information shaping device 400-1 comprises a transmission information acquiring circuitry 410-1, a segment computing circuitry 420-1, and an information storing circuitry 430-1.

The transmission information acquiring circuitry 410-1 acquires first transmission information u1 from the transmission information generating device 300-1 of the first secure computation device 1A-1 and acquires third transmission information u3 from the transmission information generating device 300-3 of the third secure computation device 1A-3.

The segment computing circuitry 420-1 receives the first and the third transmission information u1 and u3 from the transmission information acquiring circuitry 410-1, and the parameter p. The segment computing circuitry 420-1 computes a segment s in accordance with the following mathematical expression:

$$s = u1 + u3 \bmod p.$$

The information storing circuitry 430-1 stores the segment s and the first transmission information u1 in the third shared values saving device 200-C-1.

It is noted that the method described in the present invention may be executed by a computer. A program causing this method to be executed may be distributed by storing the program in a recording medium, for example, a magnetic disk such as a floppy (registered trademark) disk, a hard disk, and so on, an optical disc such as a CD-ROM (Compact Disc-Read Only memory), a DVD (digital versatile disc) and so on, a magneto-optical disc, a semiconductor memory, or the like.

Furthermore, the recording medium may have any form of a storage format as far as the recording medium can store the program and can be read by the computer.

In addition, a part of each processing may be executed by an operating system operating on the computer or a middleware such as a database management software, a network software or the like on the basis of instructions of the program installed from the recording medium to the computer.

Moreover, the above-mentioned recording medium is not restricted to a medium independent from the computer and includes a recording medium in which the program transmitted via a LAN (Local Area Network), the Internet, or the like is downloaded and stored or temporarily stored.

In addition, the recording medium is not restricted to one and the recording medium according to this invention includes a case where the processing according to the above-mentioned example embodiment is carried out with a plurality of media. Configuration of the medium may be any configuration.

The computer in this invention executes each processing based on the program stored in the recording medium and may have any configuration such as a device composed of a personal computer or the like, a system including a plurality of devices connected via a network, and so on.

In addition, the computer in this invention is not restricted to the personal computer and is equipment or a device which includes a processing unit to be included in an information processing apparatus and which is capable of realizing the function of this invention by using the program.

While the invention has been particularly shown and described with reference to example embodiments (examples) thereof, the invention is not limited to these example embodiments (examples). It will be understood by those of ordinary skilled in the art that various changes in configuration and details may be made therein without departing from the sprit and scope of the present invention as defined by the claims.

REFERENCE SIGNS LIST 1A secure computation system
1A-1 first secure computation device
1A-2 second secure computation device
1A-3 third secure computation device
100 numerical splitting device
110 acquiring circuitry
120 random numbers generating circuitry
130 random number computing circuitry
140 segments computing circuitry
150 transmitting circuitry
200-1 first shared values saving device
200-2 second shared values saving device
200-3 third shared values saving device
200-A first shared values saving device
200-A-1 to 200-A-3 first shared values saving device
200-B second shared values saving device
200-B-1 to 200-B-3 second shared values saving device
200-C-1 to 200-C-3 third shared values saving device
201-1 to 201-3 first shared value saving unit
201-C-1, 201-C-3 first shared value saving unit
202-1 to 202-3 second shared value saving unit
202-C-1, 202-C-3 second shared value saving unit
300 transmission information generating device
300-1 to 300-3 transmission information generating device
301-1, 301-3 pseudo-random number difference generating circuitry
302-1, 302-3 transmission information computing circuitry
310 information acquiring circuitry
320 pseudo-random number difference generating circuitry
330 transmission information computing circuitry
340 transmitting circuitry 400-1 to 400-3 shared information shaping device
410-1 transmission information acquiring circuitry
420-1 segment computing circuitry
430-1 information storing circuitry

What is claimed is:

1. A numerical splitting device, comprising:
an acquiring circuitry configured to acquire a numerical value w and a parameter p;
a random numbers generating circuitry configured to generate a first random number r1 and a second random number r2 which are random and are equal to or more than zero but less than the parameter p;
a random number computing circuitry configured to compute a third random number r3 based on the numerical value w, the parameter p, the first random number r1, and the second random number r2 in accordance with a mathematical expression $r3=w-r1-r2 \mod p$;
a segments computing circuitry configured to compute first through third segments s1, s2, and s3 based on the first through the third random numbers r1, r2, and r3 and the parameter p in accordance with mathematical expressions $s1=r1+r2 \mod p$, $s2=r2+r3 \mod p$, and $s3=r3+r1 \mod p$; and
a transmitting circuitry configured to transmit a pair of the first segment s1 and the second random number r2, a pair of the second segment s2 and the third random number r3, and a pair of the third segment s3 and the first random number r1 to first through third secure computation devices, respectively.

2. A transmission information generating device configured to receive numerical values sA and tA obtained by splitting a numerical value wA, numerical values sB and tB obtained by splitting a numerical value wB, and the parameter p, which are generated from the numerical splitting device described in claim 1 and to generate transmission information u, wherein the transmission information generating device comprises:
an information acquiring circuitry configured to acquire the numerical values sA, tA, sB, and tB;
a pseudo-random number difference generating circuitry configured to generate two pseudo-random numbers by pseudo-random number generating processing and to generate a difference r between the two pseudo-random numbers using the parameter p;
a transmission information computing circuitry configured to compute the transmission information u using the numerical values sA, tA, sB, and tB and the parameter p in accordance with a mathematical expression $tAtB-sAsB+r \mod p$; and
a transmitting circuitry configured to transmit the transmission information u.

3. A secure computation device used in a secure computation system comprising first through third secure computation devices each of which includes the transmission information generating device described in claim 2, wherein the secure computation device includes a shared information shaping device comprising:
a transmission information acquiring circuitry configured to acquire transmission information u1 which is generated by the transmission information generating device of the secure computation device and transmission information u3 which is generated by the transmission information generating device of an adjacent secure computation device;
a segment computing circuitry configured to compute a segment s based on the transmission information u1 and u3 and the parameter p in accordance with a mathematical expression $u1+u3 \mod p$; and
an information storing circuitry configured to store the segment s and the transmission information u1 in an external storage device.

4. A secure computation system comprising three secure computation devices each of which is described in claim 3.

5. A numerical splitting method, comprising:
acquiring a numerical value w and a parameter p;
generating a first random number r1 and a second random number r2 which are random and are equal to or more than zero but less than the parameter p;
computing a third random number r3 based on the numerical value w, the parameter p, the first random number r1, and the second random number r2 in accordance with a mathematical expression $r3=w-r1-r2 \mod p$;
computing first through third segments s1, s2, and s3 based on the first through the third random numbers r1, r2, and r3 and the parameter p in accordance with mathematical expressions $s1=r1+r2 \mod p$, $s2=r2+r3 \mod p$, and $s3=r3+r1 \mod p$; and
transmitting a pair of the first segment s1 and the second random number r2, a pair of the second segment s2 and the third random number r3, and a pair of the third segment s3 and the first random number r1 to first through third secure computation devices, respectively.

6. A transmission information generating method which receives numerical values sA and tA obtained by splitting a numerical value wA, numerical values sB and tB obtained by splitting a numerical value wB, and the parameter p, which are generated by the numerical splitting method described in claim 5 and generates transmission information u, wherein the transmission information generating method comprises:
acquiring the numerical values sA, tA, sB, and tB;
generating two pseudo-random numbers by pseudo-random number generating processing to generate a difference r between the two pseudo-random numbers using the parameter p;
computing the transmission information u using the numerical values sA, tA, sB, and tB and the parameter p in accordance with a mathematical expression $tAtB-sAsB+r \mod p$; and
transmitting the transmission information u.

7. A split multiplication method carried out by a secure computation device used in a secure computation system comprising first through third secure computation devices each of which carries out the transmission information generating method described in claim 6, wherein the split multiplication method comprising:
acquiring transmission information u1 which is generated by the transmission information generating method in the secure computation device and transmission information u3 which is generated by the transmission information generating method in an adjacent secure computation device;
computing a segment s based on the transmission information u1 and u3 and the parameter p in accordance with a mathematical expression $u1+u3 \mod p$; and
storing the segment s and the transmission information u1 in an external storage device.

8. A non-transitory program recording medium storing a numerical splitting program, wherein the numerical splitting program causes a computer to achieve:
a function of acquiring a numerical value w and a parameter p;

a function of generating a first random number r1 and a second random number r2 which are random and are equal to or more than zero but less than the parameter p;

a function of computing a third random number r3 based on the numerical value w, the parameter p, the first random number r1, and the second random number r2 in accordance with a mathematical expression $r3=w-r1-r2 \bmod p$;

a function of computing first through third segments s1, s2, and s3 based on the first through the third random numbers r1, r2, and r3 and the parameter p in accordance with mathematical expressions $s1=r1+r2 \bmod p$, $s2=r2+r3 \bmod p$, and $s3=r3+r1 \bmod p$; and a function of transmitting a pair of the first segment s1 and the second random number r2, a pair of the second segment s2 and the third random number r3, and a pair of the third segment s3 and the first random number r1 to first through third secure computation devices, respectively.

9. A non-transitory proqram recording medium storing a transmission information generating program configured to generate transmission information u in response to numerical values sA and tA obtained by splitting a numerical value wA, numerical values sB and tB obtained by splitting a numerical value wB, and the parameter p, which are generated by using the numerical splitting program described in claim 8, wherein the transmission information generating program causes a computer to achieve:

a function of acquiring the numerical values sA, tA, sB, and tB;

a function of generating two pseudo-random numbers by pseudo-random number generating processing to generate a difference r between the two pseudo-random numbers using the parameter p;

a function of computing the transmission information u using the numerical values sA, tA, sB, and tB and the parameter p in accordance with a mathematical expression $tAtB-sAsB+r \bmod p$; and a function of transmitting the transmission information u.

10. A non-transitory program recording medium storing a split multiplication program used in a secure computation system comprising first through third secure computation devices each of which carries out the transmission information generating program described in claim 9, wherein the split multiplication program causes a computer to achieve:

a function of acquiring transmission information u1 which is generated by using the transmission information generating program in the secure computation device and transmission information u3 which is generated by using the transmission information generating program in an adjacent secure computation device;

a function of computing a segment s based on the transmission information u1 and u3 and the parameter p in accordance with a mathematical expression $u1+u3 \bmod p$; and a function of storing the segment s and the transmission information u1 in an external storage device.

* * * * *